3,407,614
HELIUM PURIFICATION
Forrest L. Poska, Bartlesville, Okla., assignor to Phillips Petroleum Company, a corporation of Delaware
Filed Dec. 19, 1966, Ser. No. 602,630
5 Claims. (Cl. 62—18)

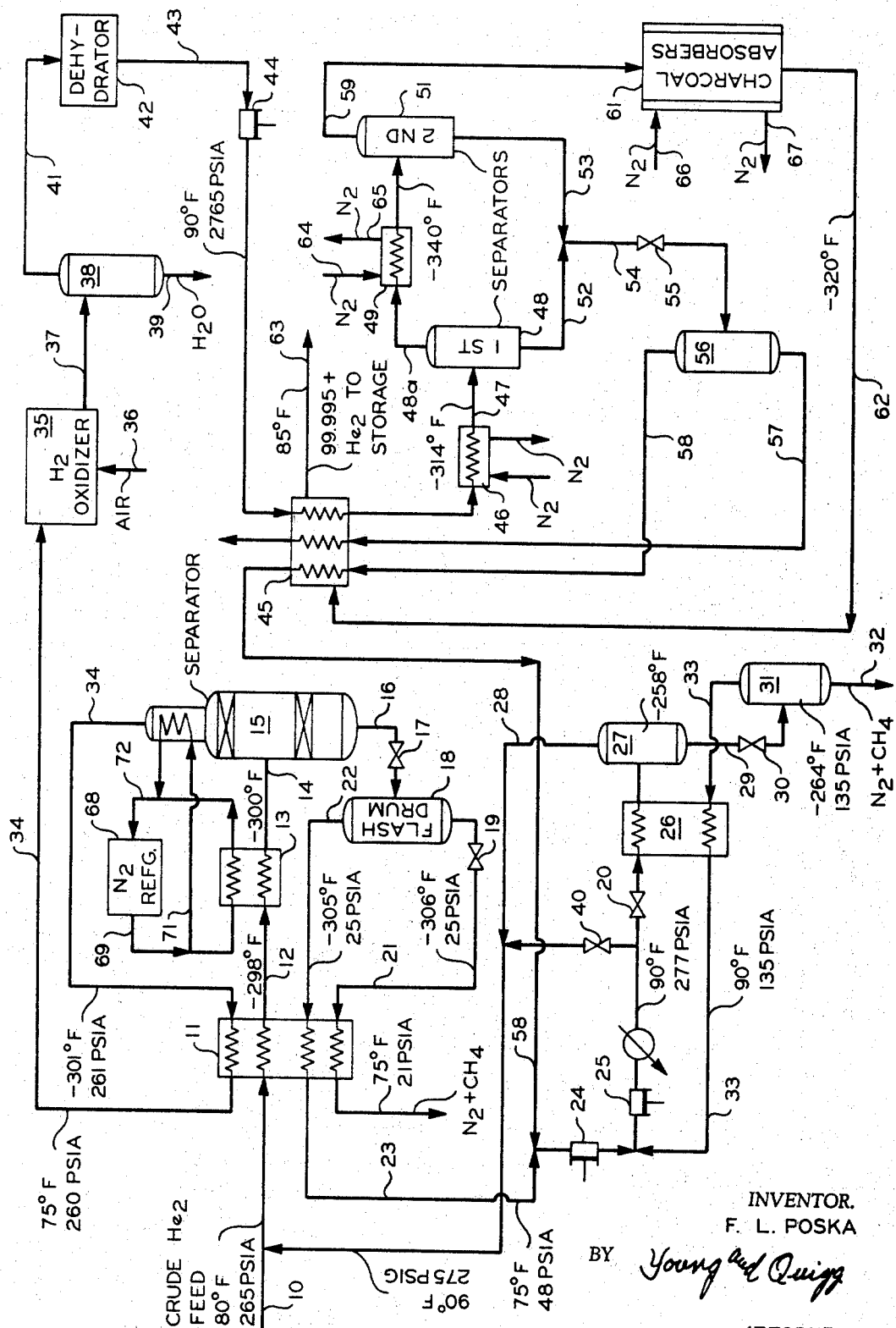

ABSTRACT OF THE DISCLOSURE

A gas feed comprised of helium, hydrogen, nitrogen and methane is cooled to a point of partial liquefaction and then separated into a liquid and gas. The liquid is flashed to provide gaseous and liquid components used as heat exchange medium in the partial liquefaction. The gas is cooled, recompressed, further cooled to partially liquefy and is itself separated, the liquid portion of which is expanded to provide multiphase fluids for heat exchange of the further cooled compressed gas and the gas helium portion is filtered in a charcoal bed.

---

This invention relates to the purification of a crude helium-containing stream. In one aspect it relates to a method for the purification of a helium-containing stream wherein substantially all of the methane and a considerable portion of the nitrogen is removed at relatively low pressure. In still another aspect this invention relates to a method for the purification of a helium-containing stream wherein the refrigeration and horsepower costs are substantially reduced.

In the purification of helium from a crude helium stream, for example, a stream containing about 35 volume percent helium, the feed stream is usually compressed to about 2700 p.s.i., cooled and then refrigerated with nitrogen and autorefrigeration by letting down the pressure in stages so as to liquefy and remove the impurities which are principally methane and nitrogen. In order to make the purification of helium a feasible operation it is of utmost importance to obtain maximum efficiency of the refrigeration cycle and to maintain horsepower requirements at a minimum.

It is an object of this invention to provide a method and means for conserving energy in the purification of a crude helium-containing stream. It is also an object of this invention to provide a method and means for removing substantially all of the methane and a considerable portion of the nitrogen in a helium-containing stream at relatively low pressure. It is still another object of this invention to provide a method and means for purifying helium in a helium-containing stream by utilizing efficiently the autorefrigeration potential available in the feed stream. Other objects, aspects, and advantages of this invention will be apparent to one skilled in the art upon studying the disclosure including the detailed description of the invention and the appended drawing wherein:

The figure of the drawing is a schematic flow diagram of a preferred embodiment of the invention.

According to the process of the invention a crude helium concentrate stream, for example, one containing about 35 volume percent helium, is cooled and partially liquefied by heat exchange with cold product streams and then discharged into a phase separator. The gas phase from the separator enriched in helium is additionally cooled by nitrogen refrigeration, heat exchanged with the crude feed stream and then passed to the compressors for the final purification step. The liquid from the phase separator is flashed into a flash drum. The overhead vapors from the flash drum are passed in heat exchange with the feed and then recycled to the feed conduit and the bottoms product, or liquid from the flash drum, is flashed to slightly above atmospheric pressure and the resulting liquid and vapor are also passed in heat exchange with the feed and are then discarded as a mixture of nitrogen and methane. This mixture contains substantially all of the methane and more than half of the nitrogen contained in the crude helium feed to the process. Thus, only about half of the volume of feed gas is required to be compressed for the final purification step.

Referring now to the drawing, crude helium feed is passed via conduit 10 through heat exchanger 11, conduit 12, heat exchanger 13 and conduit 14 into separator 15. The separator 15 has a layer of packing above and below the feed inlet. The upper portion of the separator is reduced in diameter and contains in the reduced diameter portion a coil through which liquid nitrogen is circulated. The coil acts as a reflux condenser to condense and knock back methane and a portion of the nitrogen. Liquid is removed from the bottom portion of separator 15 via conduit 16 and is flashed through valve 17 so that a mixture of liquid and gas passes into flash drum 18 at reduced temperature and pressure. The bottoms product from flash drum 18 is flashed in valve 19 and passed via conduit 21 through heat exchanger 11 in countercurrent flow relationship with the feed stream in conduit 10. The material in conduit 21, which comprises a mixture of nitrogen and methane, is vented from the system. The overhead stream from flash drum 18 is passed via conduit 22 through heat exchanger 11 in countercurrent flow relationship with the feed stream in conduit 10 and then passes via conduit 23 to compressors 24 and 25 and thence through heat exchanger 26 to separator 27. The overhead stream from separator 27 is passed via conduit 28 to the feed conduit 10 for recovery of contained helium. The bottoms product from separator 27 is passed via conduit 29 to separator 31 and the bottoms product of separator 31, which comprises a mixture of nitrogen and methane, is vented from the system. The overhead product from separator 31 is passed via conduit 33 through heat exchanger 26 in countercurrent relationship to the compressed gases being passed from compressor 25 to separator 27. The materials in conduit 33 are introduced into the inlet of compressor 25. It is sometimes desirable to open valve 40 and close valve 20 and thus recycle streams 23 and 58 directly back to the feed without the removal of some of the nitrogen and methane.

The overhead product from separator 15 is passed via conduit 34 through heat exchanger 11 in countercurrent flow relationship with the feed material in conduit 10 and then to a hydrogen oxidizer 35 into which air is introduced via conduit 36 in an amount sufficient to oxidize the hydrogen in the stream in conduit 34. The effluent from oxidizer 35 is passed via conduit 37 to scrubber 38 from which condenser water is removed via conduit 39. The overhead product from scrubber 38 is passed via conduit 41 to dehydrator 42 wherein the remaining water is removed and the dried stream is then passed via conduit 43 to compressors 44. The stream in conduit 43, after being compressed in compressors 44 to about 2765 p.s.i.a. (pounds per square inch absolute) is passed through heat exchanger 45 and then through heat exchanger 46 and then via conduit 47 to first separator 48. The overhead stream from separator 48 is then passed through the heat exchanger and thence to second separator 51.

The bottoms products from separators 48 and 51 are passed via conduits 52, 53 and 54 and through flash valve 55 to separator 56. The bottoms product from separator 56 is passed via conduit 57 through heat exchanger 45 in countercurrent flow relationship with the stream in conduit 43 and is recovered as substantially pure nitrogen. The overhead stream from separator 56 is passed through conduit 58 and then through heat exchanger 45 in indirect flow relationship with the stream in conduit 43 and then is passed via conduit 58 to recycle helium compressors 24 and 25. The overhead stream from separator 51 is passed via conduit 59 to charcoal absorbers 61 and thence via conduit 62 into the shell of heat exchanger 45 and is removed from the shell via conduit 63 as highly purified helium.

Liquid nitrogen is introduced into heat exchanger 49 via conduit 64 and vapors of nitrogen are removed via conduit 65. The pressure of the boiling nitrogen in the shell of heat exchanger 49 is maintained at less than atmospheric to obtain a low temperature. Liquid nitrogen is introduced into a jacket surrounding the charcoal absorbers 61 via conduit 66 and is removed via conduit 67.

Low temperature refrigeration is provided by conventional nitrogen refrigeration apparatus such as indicated at 68. Liquid nitrogen is supplied via conduit 69 to heat exchanger 13 and is supplied to the coil in separator 15 via conduit 71 and vapors are returned from heat exchanger 13 and the coil in separator 15 via conduit 72 to the nitrogen refrigeration system 68.

It should be noted that substantially all of the methane and a substantial portion of nitrogen is removed from the crude helium feed stream at low pressure, for example, at a pressure of about 265 p.s.i.a., thus providing a substantial reduction in the load on compressors 44 and the refrigeration equipment downstream from compressors 44. The phase separator 15 acts somewhat as a rectifier because of the packing material above and below the feed inlet and because of the smaller diameter upper section containing the nitrogen condenser coil so that nitrogen and methane are condensed and flow downwardly through the packing to effect a liquid vapor contact source for the materials in the separator.

The following specific embodiment of the invention will be helpful in attaining an understanding of the invention but should be considered as exemplary and should not be construed so as to limit unduly the invention.

EXAMPLE

In a system according to the drawing operated at temperatures and pressures as indicated on the drawing, the compositions of the streams are as shown in the following Table I:

TABLE I.—STREAM IN MOLS

| Stream No | 10 | 34 | 16 | 22 | 21 | 43 |
|---|---|---|---|---|---|---|
| Helium | 538.00 | 538.0 | 4.00 | 4.00 | 0.28 | 538.00 |
| Hydrogen | 3.00 | 3.0 | 0.04 | 0.03 | 0.01 | 0.07 |
| Methane | 49.00 | 0.6 | 48.40 | 0.06 | 48.00 | 0.60 |
| Nitrogen | 986.00 | 126.0 | 860.00 | 9.10 | 851.00 | 133.00 |
| Totals | 1,606.00 | 667.6 | 912.44 | 13.19 | 899.29 | 671.67 |

It can be seen in Table I that at least half of the feed stream 10 is removed as stream 21 prior to compression and refrigeration in the final step. The values in Table I represent the mols of various components in each gas stream at any given moment or during any given period of time. Hydrogen is removed in the oxidizer 35 by introducing a sufficient amount of air to oxidize the hydrogen present in the stream. The amount of nitrogen present in stream 22 is relatively small and it may be desirable not to remove this nitrogen via conduit 32 in which case valve 20 can be closed and valve 40 can be opened so that the entire stream is returned to the feed conduit 10.

The components in the streams in the final purification step are shown in Table II.

TABLE II.—STREAM IN MOLS

| Stream No | 43 | 59 | 63 | 54 | 58 | 57 |
|---|---|---|---|---|---|---|
| Helium | 538.00 | 538.00 | 538.00 | 5.00 | 5.00 | 0.05 |
| Hydrogen | 0.07 | 0.07 | 0.00 | 0.00 | 0.00 | 0.00 |
| Methane | 0.60 | 0.00 | 0.00 | 0.60 | 0.00 | 0.60 |
| Nitrogen | 133.00 | 3.10 | 0.00 | 130.00 | 6.60 | 123.00 |
| Totals | 671.67 | 541.17 | 538.00 | 135.60 | 11.60 | 123.65 |

It should be noted in the above Table II that stream 63 is substantially pure helium and stream 57 is substantially pure nitrogen. The nitrogen stream is a valuable by-product.

In the process shown in the drawing the heat exchangers employed in the low pressure (265 p.s.i.a.) service are core type heat exchangers. The heat exchangers employed in the high pressure (2765 p.s.i.a.) service are tube-and-shell type heat exchangers. Both types are well known and available commercially.

The charcoal absorbers are operated cyclicly, i.e. one, or a bank of absorbers, is absorbing while another, or another bank of absorbers, is being regenerated.

The heat exchangers 13 and 46 utilize nitrogen boiling at about atmospheric pressure (14.7 p.s.i.a.). Heat exchanger 49 utilizes nitrogen boiling at 2.9 p.s.i.a. to lower the temperature of the helium stream to $-340°$ F. At this extremely low temperature most of the nitrogen is removed from the helium stream as indicated by the composition of stream 59 in Table II.

That which is claimed is:
1. The method of recovering helium from a mixture of gases contained in a feed stream which comprises
   (a) cooling the mixture of gases to effect formation of a first liquid phase and a first gas phase;
   (b) separating the first liquid phase while further cooling the first gas phase;
   (c) flashing the first liquid phase to a lower pressure and passing the resulting second gas and second liquid phases in indirect heat exchange with said mixture of gases to provide said cooling;
   (d) compressing said first gas phase to a pressure higher than that of said feed stream;
   (e) cooling the compressed first gas phase to effect formation of a third liquid phase and a third gas phase;
   (f) separating the third liquid phase from the third gas phase;
   (g) flashing the third liquid phase to a lower pressure and passing the resulting liquid and gas phases in indirect heat exchange with the compressed first gas phase to cool same;
   (h) passing the third gas phase in contact with charcoal to absorb impurities therefrom; and
   (i) recovering substantially pure helium from said contact with charcoal.

2. The method of claim 1 wherein the separating in (b) is effected in a zone containing particulate solids which are wetted by the liquid phase.

3. The method of claim 2 wherein the further cooling is obtained by indirect heat exchange with liquid nitrogen boiling at about atmospheric pressure.

4. The method of claim 1 wherein the second gas phase, after said heat exchange with said mixture of gases, is compressed, cooled and expanded and the liquid resulting is expelled from the system.

5. The method of claim 1 wherein the third gas phase is cooled with liquid nitrogen boiling at about 3 p.s.i.a.

References Cited

UNITED STATES PATENTS

| 2,973,834 | 3/1961 | Cicalese. | |
| 3,026,682 | 3/1962 | Palazzo | 62—23 XR |
| 3,205,669 | 9/1965 | Grossmann | 62—23 |
| 3,254,496 | 6/1966 | Roche et al. | 62—23 XR |
| 3,293,869 | 12/1966 | Karbosky et al. | 62—23 |
| 3,339,371 | 9/1967 | Ichihara | 62—23 XR |
| 2,895,303 | 7/1959 | Streeter. | |

NORMAN YUDKOFF, *Primary Examiner.*

V. W. PRETKA, *Assistant Examiner.*